United States Patent
Ivory et al.

(10) Patent No.: US 7,882,243 B2
(45) Date of Patent: Feb. 1, 2011

(54) CONNECTING EXTERNAL DEVICES TO A GAMING VOICE CHAT SERVICE

(75) Inventors: Andrew J. Ivory, Wake Forest, NC (US); Barry J. Pellas, Durham, NC (US); Matthew T. Pellas, Raleigh, NC (US); Matthew K. Thomas, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 145 days.

(21) Appl. No.: 12/113,610

(22) Filed: May 1, 2008

(65) Prior Publication Data

US 2009/0276529 A1 Nov. 5, 2009

(51) Int. Cl.
G06F 15/16 (2006.01)
(52) U.S. Cl. ...................................... 709/227
(58) Field of Classification Search ......... 709/204–207, 709/227
See application file for complete search history.

(56) References Cited

U.S. PATENT DOCUMENTS

| | | | | |
|---|---|---|---|---|
| 6,564,261 | B1* | 5/2003 | Gudjonsson et al. | 709/227 |
| 7,240,093 | B1* | 7/2007 | Danieli et al. | 709/205 |
| 2006/0067287 | A1* | 3/2006 | Kim et al. | 370/338 |
| 2006/0123082 | A1* | 6/2006 | Digate et al. | 709/205 |
| 2007/0123353 | A1* | 5/2007 | Smith | 463/42 |
| 2007/0253424 | A1* | 11/2007 | Herot et al. | 370/395.2 |
| 2008/0045286 | A1* | 2/2008 | Setty | 463/9 |
| 2008/0243853 | A1* | 10/2008 | Reding et al. | 707/9 |
| 2009/0239666 | A1* | 9/2009 | Hall et al. | 463/42 |

OTHER PUBLICATIONS

IBM, "A method for automated procurement of online assistance based on a user's emotional state in video games", http://www.ip.com, IP.com No.: IPCOM000030624D,(Aug. 20, 2004).
IBM, "Dynamic Update of Input Dictionary Based on Virtual World Play", http://www.ip.com, IP.com No.: IPCOM000154219D,(Jun. 22, 2007).
IBM TDB, "IP reachability through multi-channel wireless interface between a gateway and Internet devices", http://www.ip.com, IP.com No.: IPCOM000014237D,(Jul. 1, 2001).

* cited by examiner

*Primary Examiner*—Shawki S Ismail
(74) *Attorney, Agent, or Firm*—DeLizio Gilliam, PLLC

(57) ABSTRACT

Voice chat enhances the game playing experience by allowing gamers in different locations to have conversations within the gaming environment. Functionality can be implemented within a gaming system to send an external invitation a user who is logged out of the game system to participate in a voice chat and/or multiplayer game session. The user can choose to accept the invitation and participate in the voice chat session on a device such as a mobile phone. Automatically generating external requests improves convenience for players, especially when inviting several other players to a voice chat session, because they do not have to find external contact information for each player who is not logged in.

18 Claims, 4 Drawing Sheets

CONNECTING EXTERNAL DEVICES TO A GAMING VOICE CHAT SERVICE

BACKGROUND

Embodiments of the inventive subject matter generally relate to the field of gaming systems, and, more particularly, to connecting external devices to a gaming voice chat service.

Gaming systems, such as the XBOX 360®, allow players to engage in voice chat while playing multiplayer games over a network. Some gaming systems allow users to engage in voice chat anytime they are using the gaming system. In other gaming systems, voice chat functionality is built into specific games and can only be used while playing those games.

Gaming is becoming a more social activity with the introduction of voice chat. Voice chat adds another level of interaction during game play by allowing players in different locations to have conversations with each other like they would if they were in the same room.

SUMMARY

Embodiments include a method directed to detecting a request to initiate a voice chat session with a user who is not logged in to a voice chat service for a gaming system. An invitation to join the voice chat session is sent to an external device of the user. The external device is external to the gaming system. Acceptance of the invitation is detected. The external device is communicatively connected to the voice chat session.

BRIEF DESCRIPTION OF THE SEVERAL DRAWINGS

The present embodiments may be better understood, and numerous objects, features, and advantages made apparent to those skilled in the art by referencing the accompanying drawings.

DESCRIPTION OF EMBODIMENT(S)

The description that follows includes exemplary systems, methods, techniques, instruction sequences and computer program products that embody techniques of the present inventive subject matter. However, it is understood that the described embodiments may be practiced without these specific details. For instance, although examples refer to video game consoles, embodiments can be implemented in a computer based gaming environment. In other instances, well-known instruction instances, protocols, structures and techniques have not been shown in detail in order not to obfuscate the description.

Voice chat enhances the game playing experience by allowing gamers in different locations to have conversations within the gaming environment. Functionality can be implemented within a gaming system to send an external invitation a user who is logged out of the game system to participate in a voice chat and/or multiplayer game session. The user can choose to accept the invitation and participate in the voice chat session on a device such as a mobile phone. Automatically generating external requests improves convenience for players, especially when inviting several other players to a voice chat session, because they do not have to find external contact information for each player who is not logged in.

Figure 1:
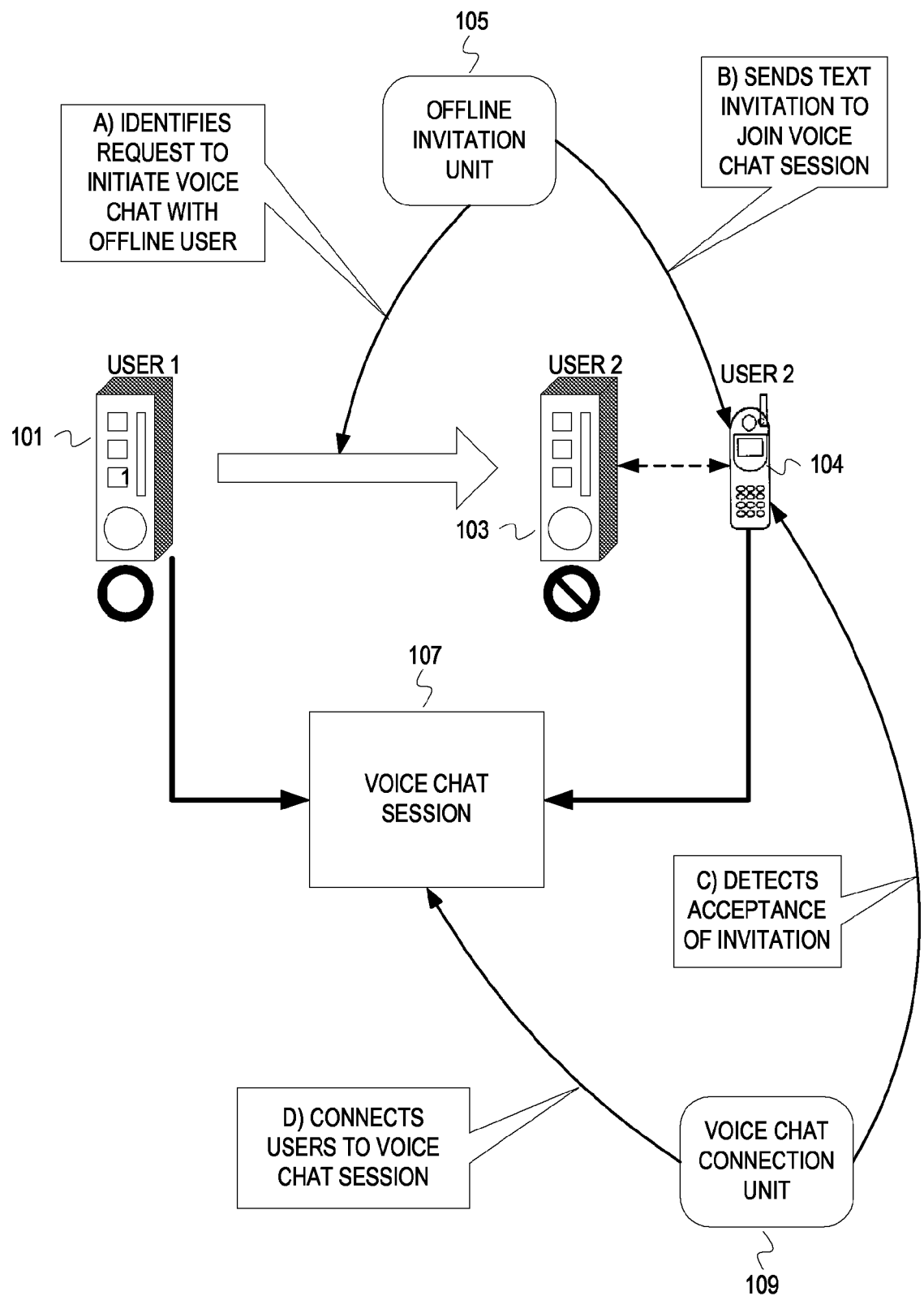
FIG. 1 depicts an example of a game console voice chat system.

FIG. 1 depicts an example of a game console voice chat system. In stage A, an offline invitation unit 101 identifies a request from a game console 101 belonging to user 1 to connect a game console 103 belonging to user 2 to a voice chat session 107. User 2 is not logged in to the game console 103, so the game console 103 cannot be connected to the voice chat session 107.

At stage B, the offline invitation unit sends a text invitation to join the voice chat session 107 to a mobile phone 104 belonging to user 2. The text notification may be a short message service (SMS) text message, an e-mail, etc. The text invitation identifies the user requesting the voice chat session 107 and includes information about connecting to the voice chat session. In some embodiments, the user may be connected to the voice chat session 107 automatically when the invitation is accepted. For example, the invitation contains an acceptance link that causes the mobile phone 104 to dial-in to the voice chat session in response to activating the link. In other embodiments, the user may manually connect to the voice chat session 107 by dialing a number listed in the invitation and entering a specific code corresponding to the voice chat session 107. In addition, the invitation may be an invitation to join an online game session or a combination of an invitation to join a voice chat session and an online game session.

At stage C, a voice chat connection unit 109 detects acceptance of the invitation to join the voice chat session 107. Acceptance is detected in response to user interactions including activating an acceptance link, dialing an access phone number, returning a text message, etc.

At stage D, the voice chat connection unit 109, connects user 1's console 101 and user 2's mobile phone 104 to the voice chat session 107. In some embodiments, the connection process may be initiated by a server hosting the voice chat session 107. For example, a user accepts the invitation by returning a text message containing a telephone number. The server receives that text message and places a call to the telephone number to connect the user to the voice chat session 107. In other embodiments, the connection process is initiated by the user (e.g., calling a voice chat access phone number) or the external device (e.g., dialing an access phone number in response to activation of a link).

Figure 2:
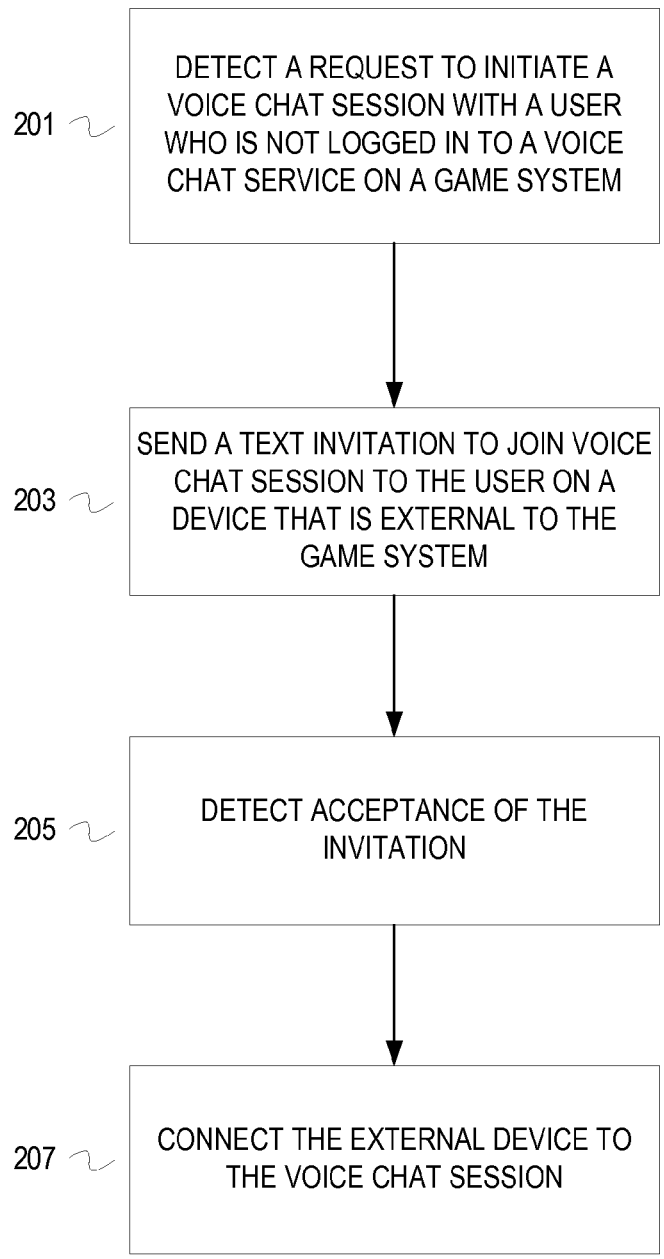
FIG. 2 is a flowchart depicting example operations to connect a user to a voice chat session from an external device.

FIG. 2 is a flowchart depicting example operations to connect a user to a voice chat session from an external device. Flow begins at block 201, where a request to initiate a voice chat session with a user who is not logged in to a voice chat service on a game system is detected. Examples of game systems include the XBOX 360® game system, Playstation® 3 game system, a personal computer, etc. Voice chat functionality may be implemented on the game system itself or within specific games. A user can play games on a game system without logging in to a voice chat service.

At block 203, a text invitation to join the voice chat session is sent to the user on a device that is external to the game system ("external device"). Examples of external devices include a mobile phone, a landline phone a computer with an instant messaging service that allows voice chat, etc. The text invitation may be an SMS text message, an instant message, an electronic mail message, etc.

At block 205, acceptance of the invitation is detected.

At block 207, the external device is connected to the voice chat session. The voice chat session may be hosted on a server associated with a game console producer, a game developer or a third party voice chat service provider.

Figure 3:
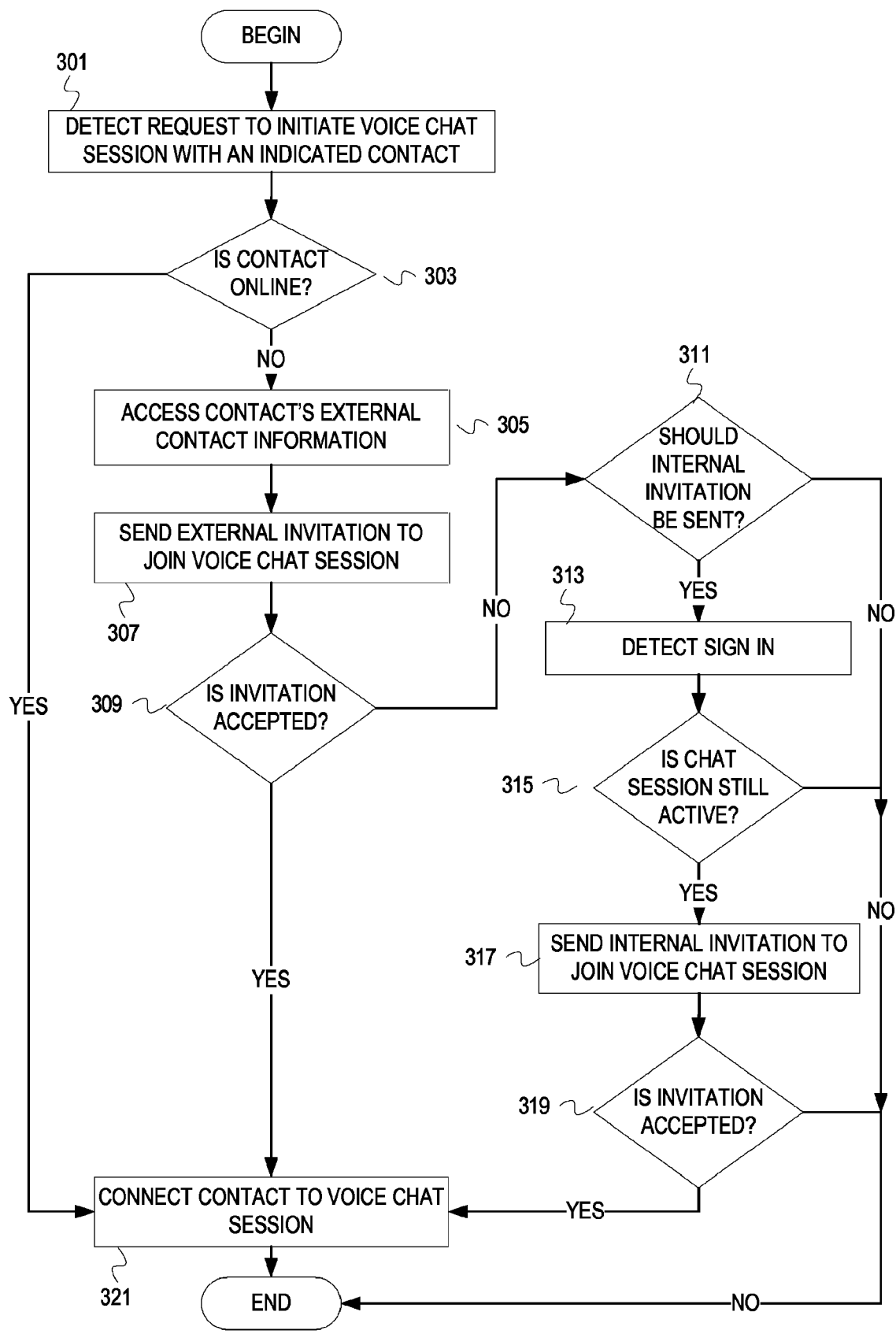
FIG. 3 is a flowchart depicting example operations for connecting an external device to a voice chat session.

FIG. 3 is a flowchart depicting example operations for connecting an external device to a voice chat session. Flow begins at block 301, where a request to initiate a voice chat session with an indicated contact is detected. A user indicates the contact by selecting the contact from a contacts list, typing the contact's username into a textbox, searching for the contact, etc. A voice chat session comprises two or more users.

At block 303, it is determined if the contact is online. The user is online if they are currently signed in to a voice chat service on a gaming system. If the contact is online, flow continues at block 321. If the contact is not online, flow continues at block 305.

At block 305, external contact information for the contact is accessed. External contact information is supplied by the contact and is stored in the contact's profile on a server. External contact information may include a mobile phone number, a landline phone number, one or more e-mail addresses, an instant messaging username, etc.

At block 307, an external invitation is sent to the contact to join the voice chat session. In some embodiments the external invitation is automatically sent to the contact when they are offline. In other embodiments, the user initiating the voice chat request may be prompted with an option to send the external invitation. In addition, configurations may be set by users to indicate preferences on receiving and/or sending external invitations. For example, a user may prefer to always receive external invitations, but would prefer to be prompted before sending external invitations. As another example, a user may prefer to only receive external invitations from certain users. As another example, a configuration can indicate that a first set of users can send external invitations to an instant message identity and a cell phone number, but a second set of users is limited to sending external invitations to an e-mail address.

At block 309, it is determined if the external invitation is accepted. If the external invitation is accepted flow continues at block 321. If the external invitation is not accepted, flow continues at block 311.

At block 311, it is determined if an internal invitation should be sent. An internal invitation is sent to the contact within a voice chat service. For example, a contact may wish to receive an internal invitation because he or she is planning to log into the game system to play games and participate in the voice chat, but does not want to connect to the voice chat on the external device. In this case, the contact temporarily rejects the external invitation to join the chat. As another example, a contact may not want to participate in the chat on an external device or by logging in to the game system. In this case, the contact completely rejects the invitation. Embodiments that provide the options of completely rejecting or temporarily rejection an invitation can also maintain a queue and/or reservation for the user in accordance with rejection/acceptance of an invitation. If an external invitation is temporarily rejected, then an entry in a queue and/or a reservation in the voice chat and/or game can be reserved for the user. Embodiments can also surrender an entry in the queue and/or delete or mark a reservation to reflect complete rejection of the external invitation by the user. If an internal invitation should be sent, flow continues at block 313. If an internal invitation should not be sent, flow ends.

At block 313, the voice chat service detects that the contact has signed in.

At block 315, it is determined if the voice chat session is still active. A voice chat session is active when two or more users are participating in the voice chat session or the user who initiated the request for the voice chat session is still online. If the chat session is still active, flow continues at block 317. If the chat session is not active, flow ends.

At block 317, an internal invitation to join the voice chat session is sent.

At block 319, it is determined if the internal invitation has been accepted. If the internal invitation has been accepted, flow continues at block 321. If the internal invitation has not been accepted, flow ends.

At block 321, the contact is connected to the voice chat session. In some embodiments, the connection may be a peer-to-peer connection managed by the game systems and external devices connected to the voice chat session. In other embodiments, the connection between game systems and external devices is managed by a server.

It should be understood that the depicted flowchart are examples meant to aid in understanding embodiments and should not be used to limit embodiments or limit scope of the claims. Embodiments may perform additional operations, fewer operations, operations in a different order, operations in parallel, and some operations differently. For instance, referring to FIG. 3, invitations to join a multiplayer game may be initiated by a user and sent to an external device with or without an invitation to join a voice chat session. Also referring to FIG. 3, an internal invitation may automatically be sent when an external invitation is sent. In addition, different acceptance options may be presented to a contact in an invitation. For example, options to temporarily reject or completely reject the invitation are presented. If the contact chooses to temporarily reject the invitation, an internal invitation may be sent when the contact logs in to the game system or another external invitation may be sent at a later time. If the contact chooses to completely reject the invitation, no internal invitation will be sent to the contact.

Embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments of the inventive subject matter may take the form of a computer program product embodied in any tangible medium of expression having computer usable program code embodied in the medium. The described embodiments may be provided as a computer program product, or software, that may include a machine-readable medium having stored thereon instructions, which may be used to program a computer system (or other electronic device(s)) to perform a process according to embodiments, whether presently described or not, since every conceivable variation is not enumerated herein. A machine readable medium includes any mechanism for storing or transmitting information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions. In addition, embodiments may be embodied in an electrical, optical, acoustical or other form of propagated signal (e.g., carrier waves, infrared signals, digital signals, etc.), or wireline, wireless, or other communications medium.

Computer program code for carrying out operations of the embodiments may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN), a personal area network (PAN), or a wide area network (WAN), or the connection may be made to an external computer (for example, through the Internet using an Internet Service Provider).

Figure 4:
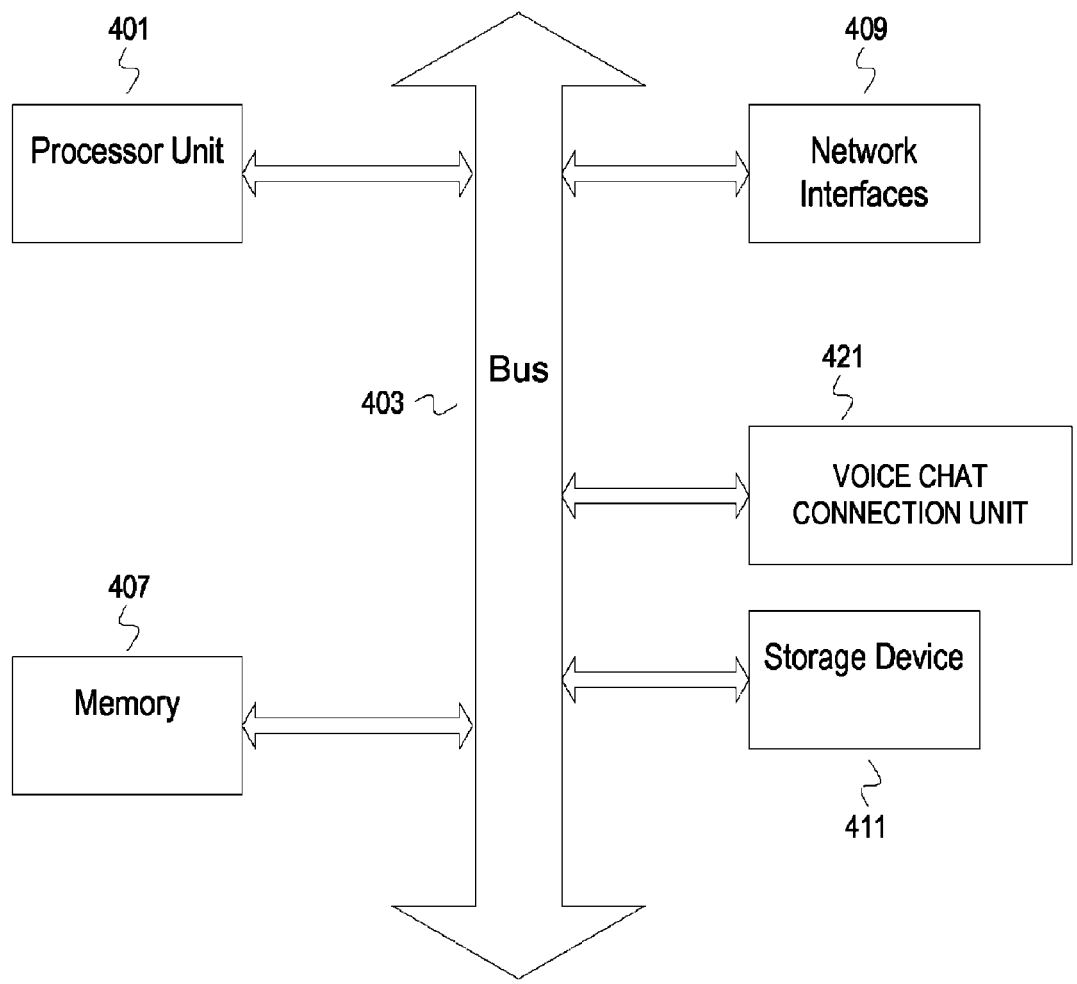
FIG. 4 depicts an example computer system.

FIG. 4 depicts an example computer system. A computer system includes a processor unit 401 (possibly including multiple processors, multiple cores, multiple nodes, and/or implementing multi-threading, etc.). The computer system includes memory 407. The memory 407 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system also includes a bus 403 (e.g., PCI, ISA, PCI-Express, HyperTransport®, InfiniBand®, NuBus, etc.), a network interface 409 (e.g., an ATM interface, an Ethernet interface, a Frame Relay interface, SONET interface, wireless interface, etc.), and a storage device(s) 411 (e.g., optical storage, magnetic storage, etc.). The computer system also includes a voice chat connection unit 421 that sends invitations to join voice chat sessions to external devices and connects the external devices to the voice chat sessions upon detecting acceptance of the invitation. Any one of these functionalities may be partially (or entirely) implemented in hardware and/or on the processing unit 401. For example, the functionality may be implemented with an application specific integrated circuit, in logic implemented in the processing unit 401, in a co-processor on a peripheral device or card, etc. Further, realizations may include fewer or additional components not illustrated in FIG. 4 (e.g., video cards, audio cards, additional network interfaces, peripheral devices, etc.). The processor unit 401, the storage device(s) 411, and the network interface 409 are coupled to the bus 403. Although illustrated as being coupled to the bus 403, the memory 407 may be coupled to the processor unit 401.

While the embodiments are described with reference to various implementations and exploitations, it will be understood that these embodiments are illustrative and that the scope of the inventive subject matter is not limited to them. For instance, embodiments are not limited to text based invitations. Embodiments can use graphics based invitations, audio invitations, etc., received by an applet or other executing piece of code on the external device. In general, techniques as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method comprising:
    detecting a request to initiate a voice chat session with a user who is not logged in to a voice chat service for a gaming system;
    sending an external invitation to join the voice chat session to an external device of the user, wherein the external device is external to the gaming system;
    detecting rejection of the external invitation;
    responsive to said detecting rejection of the external invitation, storing an indication to send an internal invitation to the user, wherein the internal invitation is internal to the gaming system;
    detecting sign-in of the user into the voice chat service for the gaming system;
    determining that the voice chat session is still active based on determining that an entry exists in a queue of voice chat reservations;
    sending the internal invitation to the user through the gaming system responsive to said determining that the voice chat session is still active; and
    connecting the user to the voice chat session responsive to acceptance of the internal invitation.

2. The method of claim 1 further comprising determining a sign in status of the user on the voice chat service.

3. The method of claim 1, wherein said invitation comprises at least one of a short message service text message, an instant message and an electronic mail message.

4. The method of claim 1, wherein said invitation comprises an invitation to a voice chat session and an invitation to join an online game session.

5. The method of claim 1, wherein said external device comprises at least one of a mobile phone, a landline phone and a computer running an application for second voice chat service.

6. The method of claim 1 further comprising accessing external contact information for the user, wherein the external contact information indicates the external device.

7. The method of claim 6 further comprising determining preferences associated with the external contact information, wherein said sending the invitation to join the voice chat session to the external device of the user is in accordance with the preferences.

8. The method of claim 1, further comprising creating the entry for the internal invitation in the queue of voice chat reservations.

9. The method of claim 8 further comprising:
    detecting a request to initiate a second voice chat session with a second user who is not signed in to the voice chat service;
    sending a second external invitation to join the second voice chat session to an external device of the second user;
    detecting rejection of the second external invitation;
    responsive to said detecting rejection of the second external invitation, storing an indication to send a second internal invitation to the second user;
    detecting, at least one of, that the internal invitation has been rejected and that the voice chat session is no longer active; and
    removing an entry that represents the second internal invitation from the queue.

10. One or more non-transitory machine-readable media having stored therein a program product, which, when executed a set of one or more processor units, causes the set of one or more processor units to perform operations that comprise:
- detecting a request to initiate a voice chat session with a user who is not logged in to a voice chat service for a gaming system;
- sending an external invitation to join the voice chat session to an external device of the user, wherein the external device is external to the gaming system;
- detecting rejection of the external invitation;
- responsive to said detecting rejection of the external invitation, storing an indication to send an internal invitation to the user, wherein the internal invitation is internal to the gaming system;
- detecting sign-in of the user into the voice chat service for the gaming system;
- sending the internal invitation to the user through the gaming system, wherein said sending the internal invitation to the user through the gaming system comprises determining that the voice chat session is still active based on determining that an entry exists in a queue of voice chat reservations; and
- connecting the user to the voice chat session responsive to acceptance of the internal invitation.

11. The non-transitory machine-readable media of claim 10, wherein the operations further comprise determining a sign in status of the user on the voice chat service.

12. The non-transitory machine-readable media of claim 10, wherein said invitation comprises at least one of a short message service text message, an instant message and an electronic mail message.

13. The non-transitory machine-readable media of claim 10, wherein said invitation comprises an invitation to a voice chat session and an invitation to join an online game session.

14. The non-transitory machine-readable media of claim 10, wherein said external device comprises at least one of a mobile phone, a landline phone and a computer running an application for second voice chat service.

15. The non-transitory machine-readable media of claim 10, wherein the operations further comprise accessing external contact information for the user, wherein the external contact information indicates the external device.

16. The non-transitory machine-readable media of claim 15, wherein the operations further comprise determining preferences associated with the external contact information, wherein said sending the invitation to join the voice chat session to the external device of the user is in accordance with the preferences.

17. The non-transitory machine-readable media of claim 10, wherein the operations further comprise creating the entry for the internal invitation in the queue of voice chat reservations.

18. The non-transitory machine-readable media of claim 17, wherein the operations further comprise:
- detecting a request to initiate a second voice chat session with a second user who is not signed in to the voice chat service;
- sending a second external invitation to join the second voice chat session to an external device of the second user;
- detecting rejection of the second external invitation;
- responsive to said detecting rejection of the second external invitation, storing an indication to send a second internal invitation to the second user;
- detecting, at least one of, that the internal invitation has been rejected and that the voice chat session is no longer active; and
- removing an entry that represents the second internal invitation from the queue.

* * * * *